June 19, 1945. H. W. IBBOTT 2,378,851
SELF-ALIGNING ANTIVIBRATION COUPLING
Filed Oct. 9, 1942
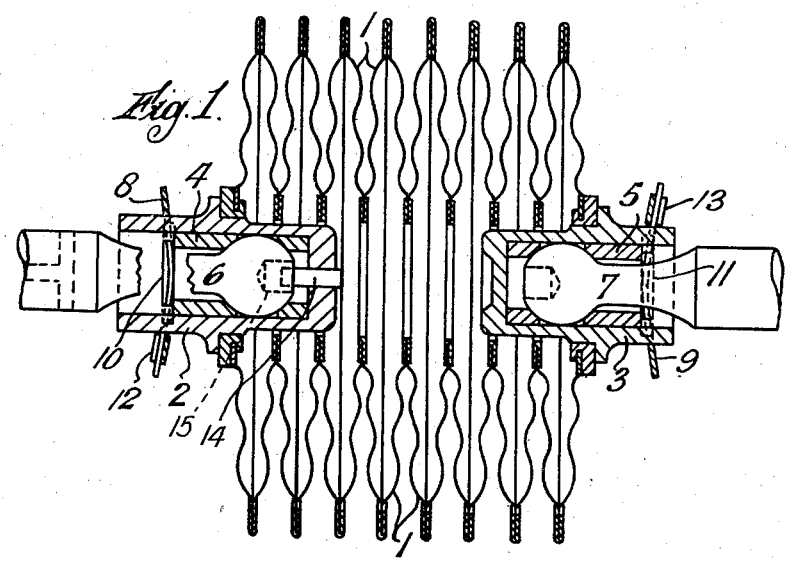
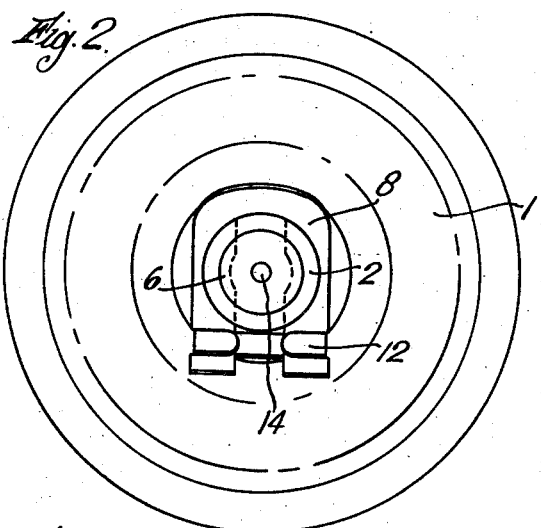
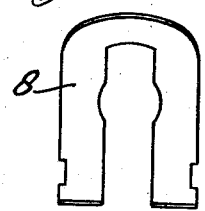
Inventor
Harold W. Ibbott
By his attorneys,
Baldwin & Wight Patented June 19, 1945

2,378,851

UNITED STATES PATENT OFFICE 2,378,851

SELF-ALIGNING ANTIVIBRATION COUPLING

Harold William Ibbott, London, England, assignor to Negretti & Zambra, London, England Application October 9, 1942, Serial No. 461,466
In Great Britain August 7, 1942

1 Claim. (Cl. 287—87)

This invention relates to an improved self-aligning anti-vibration suspension mounting for a flexible device, such as a diaphragm stack or bellows, required to transmit its movements of endwise expansion and contraction due to its flexure in response to variable conditions to which it is exposed.

The object of the invention is to ensure that the said movements, for example the axial expansion and contraction of a diaphragm stack when subjected to pressure changes, will be satisfactorily transmitted to operate or to influence the operation of control apparatus, even whilst under the influence of severe vibration.

The mounting according to the invention is characterised by comprising damped ball-jointed connections between the ends of the flexible device and the ends of the members serving to transmit the movements of the flexible device.

The ends of the flexible device may accordingly be secured to housing members carrying bearing blocks caused to bear with pressure on spherical ends of the transmission. For example, the housing members have open ends outwardly of the flexible device into which pass spherically ended transmission rods substantially co-axial with the axis of expansion and contraction of the flexible device. The bearing blocks may be slidably mounted in the housing members and be caused to bear by spring pressure on the spherical ends of the transmission, front and rear. Preferably the spring pressure is applied by means of spring clips which are secured in the housing members so as to present within the housing member a bowed portion which engages the rear portion of a rearward bearing block or blocks and urges the latter against the spherical end of the transmission which in turn is urged against a forward bearing block or blocks, so that the spherical end is firmly sandwiched between bearing blocks. The degree of friction imparted by the spring clips is such that the effects of vibration are neutralised to an extent such that no damage to the diaphragm stack can result and free alignment is assisted.

The invention is illustrated in the accompanying drawing, in which Figure 1 is a longitudinal section, and Figure 2 an end view of one way of mounting a diaphragm stack, and Figures 3 and 4 are detail views.

In the drawing 1 indicates a diaphragm stack the ends of which are fast with housings 2, 3. Mounted in bearing blocks 4, 5 in the housings are spherical ended rods 6, 7, friction between the spherical ended rods and the bearing blocks being maintained by means of spring clips 8, 9. These spring clips, shown more particularly in Figures 3 and 4 are bifurcated and bowed so that when they are inserted in slots 10, 11 cut in the housings 2, 3 the forked part of the clips project through the inner diameter of the housings and bear on the bearing blocks 4, 5. The bowing of the spring clips imparts spring pressure on the bearing blocks and this in turn has a frictional or damping effect on the spherical ended rods, the spring clips also serving to lock together the whole assembly comprising the spherical ended rods, the bearing blocks and the housings. Retaining clips 12, 13 are provided to hold the spring clips 8, 9 in position.

In operation the rod 6 is held in a position determined by manual setting whilst the rod 7 moves in response to pressure changes in the atmosphere surrounding the diaphragm stack 1, and transmits the movement directly or indirectly to a control e. g. a piston valve.

The pin 14 is provided for the purpose of sealing the opening leading into the diaphragm stack after the latter has been evacuated to a predetermined degree or has been supplied with a filling of gas at a predetermined pressure. The recess 15 in the spherical ended rod freely accommodates the projecting end of the pin 14.

It will be seen that when a diaphragm stack is mounted as set out above, and subjected to the influence of severe vibrations, the tendency of the sides of the corrugated diaphragm to hammer against each other and thus set up fatigue in the material, is eliminated and its free alignment is assisted. In addition the centres of suspension have been brought as nearly as possible to that position at which balance of the masses on either side is obtained.

Whereas the above means provides against damage caused by lateral vibrations, the form of the diaphragm allows it to be constructed of a heavy gauge of material and consequently prevents damage which would otherwise occur during longitudinal vibrations.

What I claim is:

A mounting comprising a transmission rod having a spherical end, a housing member adapted to be secured to a flexible device, said housing member having an open end in which the spherical end of said transmission rod is disposed, a bearing block slidably mounted on the housing member, a U-shaped spring element having a bifurcation engaging said housing member and having arms, said housing member having a slot through its wall occupied by one of said arms, the latter arm being bowed axially of the housing to engage the end of the bearing block to urge the latter against the rear portion of the said spherical end.

HAROLD WILLIAM IBBOTT.